(12) United States Patent
Park et al.

(10) Patent No.: US 7,126,532 B2
(45) Date of Patent: Oct. 24, 2006

(54) APPARATUS FOR TRACING AN OPTIMAL DIRECTION TO RECEIVE SATELLITE SIGNAL IN ACTIVE PHASE ARRAY ANTENNA SYSTEM

(75) Inventors: Ung Hee Park, Daejon (KR); Soon Ik Jeon, Daejon (KR); Jae Seung Yun, Seoul (KR)

(73) Assignee: Electronics and Telecommunications Research Institute(KR)

( * ) Notice: Subject to any disclaimer, the term of this patent is extended or adjusted under 35 U.S.C. 154(b) by 32 days.

(21) Appl. No.: 10/456,844

(22) Filed: Jun. 6, 2003

(65) Prior Publication Data
US 2005/0017917 A1   Jan. 27, 2005

(30) Foreign Application Priority Data
Aug. 31, 2002   (KR) ............... 10-2002-0052216

(51) Int. Cl.
G01S 3/28 (2006.01)
G01S 5/02 (2006.01)

(52) U.S. Cl. ...................... 342/383; 342/427
(58) Field of Classification Search ................ 342/427, 342/354, 383
See application file for complete search history.

(56) References Cited

U.S. PATENT DOCUMENTS 3,803,625 A * 4/1974 Nemit .................. 342/368

6,650,281 B1 * 11/2003 Caille et al. ............... 342/354

FOREIGN PATENT DOCUMENTS

| KR | 1999-0053980 | 7/1999 |
|----|--------------|--------|
| KR | 1019990248400 | 12/1999 |
| KR | 1020000060658 | 10/2000 |
| KR | 1020010063792 | 7/2001 |

* cited by examiner

*Primary Examiner*—Gregory C. Issing
(74) *Attorney, Agent, or Firm*—Blakely Sokoloff Taylor & Zafman

(57) ABSTRACT

The present invention relates to a signal combining apparatus of the active phase array antenna. The signal combining apparatus includes a plurality of signal distributors for receiving a signal from an antenna array element located at boundary between sub antenna arrays and distributing the signal to the sub antenna arrays, which include the antenna array element; and a plurality of signal combiners for combining the signal from a plurality of antenna elements and the signal distributors in corresponding sub antenna array. The present invention can prevent degrade a performance caused by sudden phase difference and can effectively receive tracing signal by passing a signal of antenna element located at boundary between sub arrays antenna to both signal combiners corresponding to both of sub antenna arrays.

2 Claims, 4 Drawing Sheets

FIG. 2
(PRIOR ART)
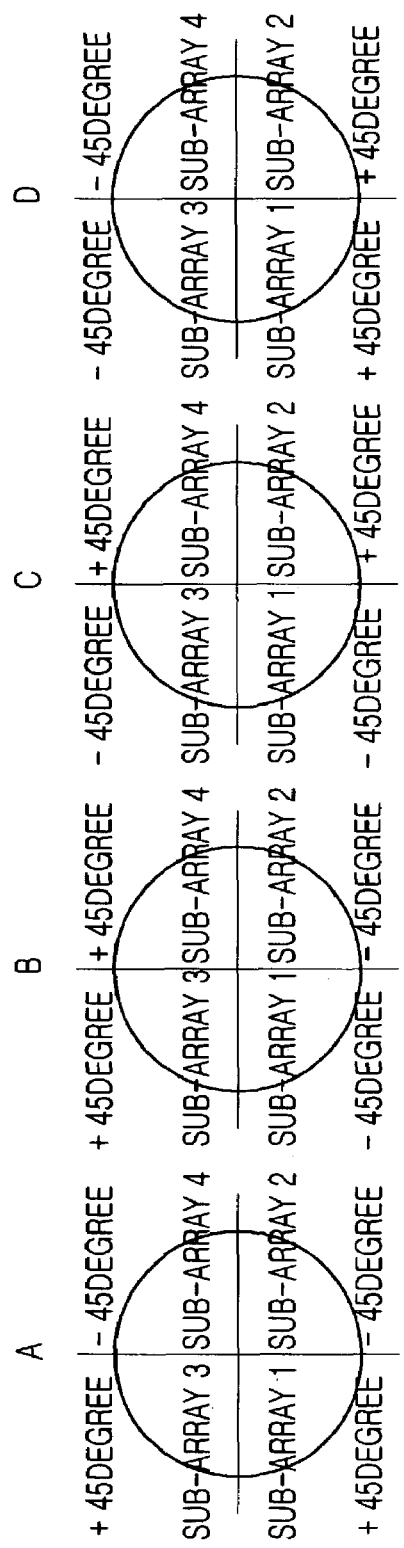
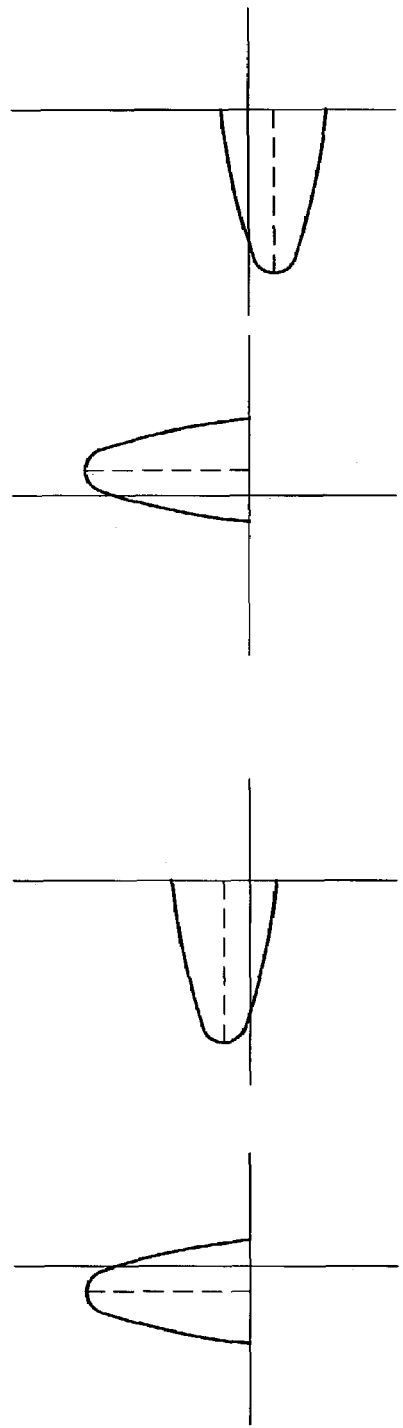

FIG. 4
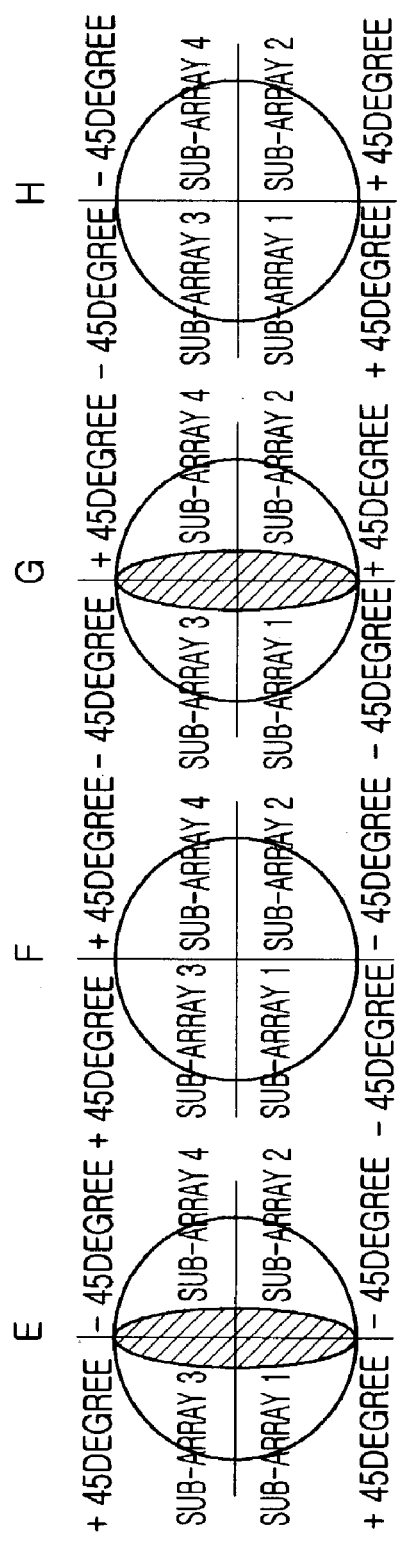
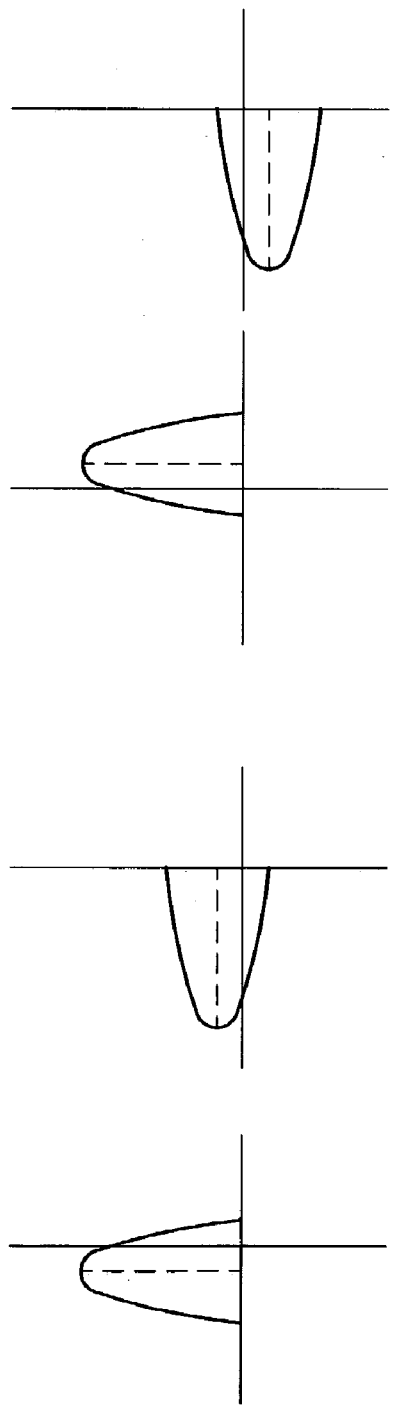

US 7,126,532 B2

APPARATUS FOR TRACING AN OPTIMAL DIRECTION TO RECEIVE SATELLITE SIGNAL IN ACTIVE PHASE ARRAY ANTENNA SYSTEM

FIELD OF THE INVENTION

The present invention relates to an apparatus for tracing a satellite signal in an active phase array antenna system; and, more particularly, to an apparatus for finding the optimal direction in order to receive the satellite signal in an active phase array antenna system.

DESCRIPTION OF RELATED ARTS

Generally, in an active phase array antenna system, there have been many conventional methods for tracing a satellite signal or finding the optimal direction to receive the satellite signal such as a step track, a mono pulse and high-order mode.

The above mentioned methods have several disadvantages in finding an optimal location of a satellite in real time. Therefore, a method for electrically tracing the satellite signal has been recently introduced. The method finds the optimal direction of a satellite by utilizing 4 sub antenna arrays outputting signals in four directions.

FIG. 1 is a diagram for illustrating an active phase array antenna.

Referring to FIG. 1, the active phase array antenna includes sub antenna arrays 101 to 104, receivers 111 to 114, phase shifters (PS) 121 to 124, a signal processor 130, a signal converter 140 and a beam tilting control and phase tracing unit 150.

The active phase array antenna receives satellite signals by using four sub antenna arrays. The satellite signals received from each of sub antenna arrays are transmitted to one of corresponding receivers 111 to 114. The receiver distributes the satellite signals to one of corresponding phase shifters 121 to 124 and the signal processing unit 130 through two distinct paths.

One of the distributed satellite signals are inputted to the signal processing unit 130 and another of the distributed satellite signals is inputted to the beam tilting control and phase tracing unit 150 through the signal converter 140 for tracing the location of the satellite.

To find the optimal direction for receiving a satellite signal, the active phase array antenna compares phases of each of the sub antenna arrays by using the beam tilting control and phase tracing unit 150.

Hereinafter, the basic principle of the active phase array antenna for finding the optimal direction to receive the satellite signal is explained in detail.

FIG. 2 shows graphs representing comparative phases of variable phase shifter according to each of the sub antenna arrays.

To find the optimal direction for receiving the satellite signal, the number of the antenna elements included in the antenna system has to be a multiple of 4. Here, for example, the antenna has four sub antenna arrays and each of the sub antenna arrays has eight antenna elements.

The phase shifter can determine a comparative phase between each of the sub antenna arrays 101 to 104. According to the comparative phase, there is a pattern between each of the sub antenna arrays 101 to 104 and there are 4 patterns A, B, C and D shown in FIG. 2.

In a pattern A, the comparative phase difference between the sub antenna array 3 and 1 is 45 degrees and the comparative phase difference between the sub antenna array 4 and 2 is −45 degrees.

In a pattern C, the comparative phase difference between the sub antenna array 3 and 1 is −45 degrees and the comparative phase difference between the sub antenna array 4 and 2 is 45 degrees.

Referring to FIG. 2, the phases of the received satellite signals of the pattern A and C are vertically symmetric.

On the other hand, in a pattern B, the comparative phase difference between the sub antenna array 3 and 4 is 45 degrees and the comparative phase difference between the sub antenna array 1 and 2 is −45 degrees.

In a pattern D, the comparative phase difference between the sub antenna array 3 and 4 is −45 degrees and the comparative phase difference between the sub antenna array 1 and 2 is 45 degrees.

Referring to FIG. 2, the phases of the received satellite signals of the pattern B and D are horizontally symmetric.

Therefore, if there is no phase difference between the pattern A and C and the pattern B and D, then the direction for receiving the satellite signal is optimal. By using the above mentioned principle, the optimal direction can be found easily.

However, in the above-mentioned method, the four sub antenna arrays must have the same number of antenna elements. If they are not the same, some antenna elements in each of the sub antenna arrays are not used. Otherwise, the conventional method cannot be used for finding the optimal direction to receive the satellite signal. As a result, effectiveness is decreased.

Alternatively, a weight is applied to each received tracing signal. As a result, it increases complexity of the hardware of the active phase array antenna.

SUMMARY OF THE INVENTION

It is, therefore, an object of the present invention to provide a signal combining apparatus in an active phase array antenna for effectively using an input signal by distributing the signal of an antenna element located at the boundary of sub antenna arrays to the nearest sub antenna arrays. Further, the present invention balances the strength of the signal inputted to each sub antenna array in case that the number of antenna elements is not four times of an integer number for a phase array antenna having four sub antenna arrays.

In accordance with an aspect of the present invention, there is provided a signal combining apparatus of an active phase array antenna having a plurality of antennas elements arranged to form at least two sub antenna arrays, the apparatus including: a distribution unit for receiving a signal from a boundary antenna element located at boundary between two neighboring sub antenna arrays and distributing the signal to the nearest sub antenna arrays, which share the boundary antenna element; and a combining unit for combining the distributed signal and the received signal from the antenna elements of the corresponding sub antenna array.

BRIEF DESCRIPTION OF THE DRAWING(S)

The above and other objects and features of the present invention will become apparent from the following description of the preferred embodiments given in conjunction with the accompanying drawings, in which:

FIG. 2 is a graph for explaining the sub antenna array in FIG. 1;

FIG. 4 is a graph for explaining the sub antenna array in accordance with a preferred embodiment of the present invention.

DETAILED DESCRIPTION OF THE INVENTION

Other objects and aspects of the invention will become apparent from the following description of the embodiments with reference to the accompanying drawings, which is set forth hereinafter.

Figure 1:
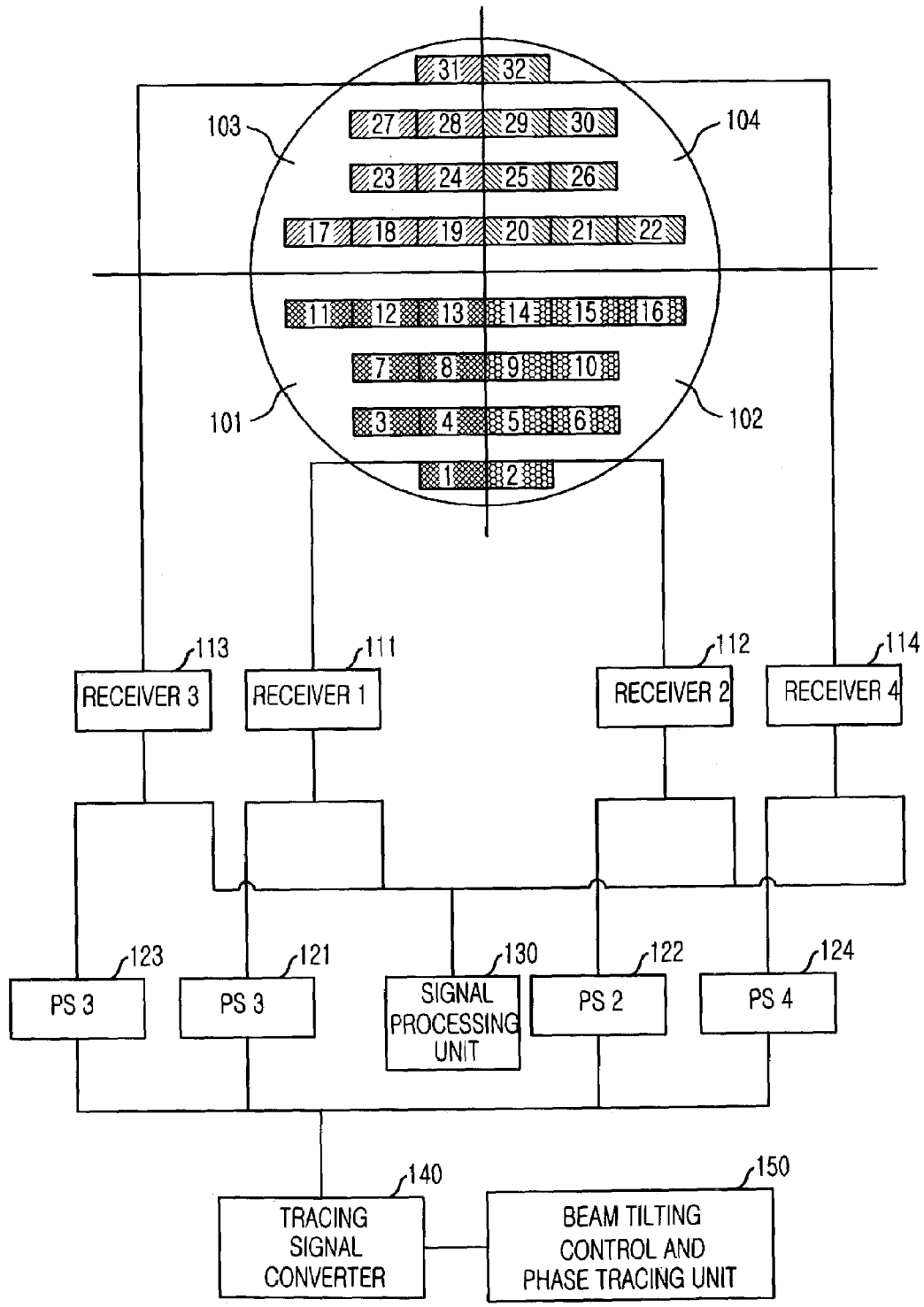
FIG. 1 is a diagram for illustrating an active phase antenna array.
Figure 3:
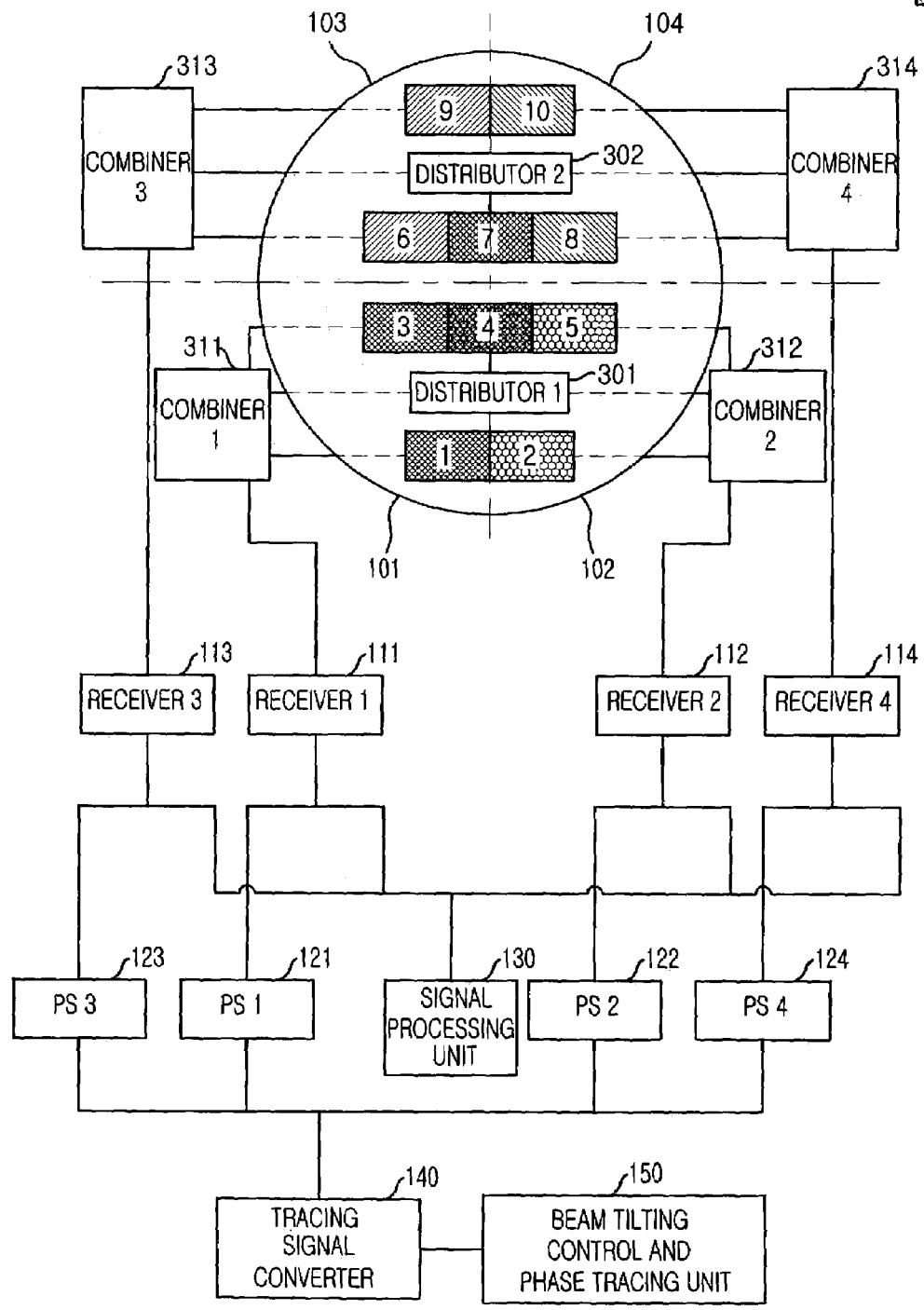
FIG. 3 is a diagram for depicting a signal combining apparatus of an active phase array antenna in accordance with a preferred embodiment of the present invention.

FIG. 3 is a diagram for depicting an apparatus for finding an optimal direction to receive a satellite signal in accordance with a preferred embodiment of the present invention. For describing the present invention in detail, an active phase array antenna having 10 antenna elements is used as an example.

Referring to FIG. 3, the apparatus includes a first signal distributor 301, a second signal distributor 302 and four signal combiners 311 to 314.

The first signal distributor 301 and the second signal distributor 302 distribute signals from the antenna elements 4 and 7, respectively.

The signal combiner 311 receives signals from the first signal distributor 301, an antenna element 1 and antenna element 3. After receiving the signals, the signal combiner 311 combines the signals and transmits the combined signal to the receiver 111.

The signal combiner 312 receives signals from the signal distributor 301, the antenna element 2 and antenna element 5. After receiving the signals, the signal combiner 312 combines the signal and transmits the combined signal to the receiver 2.

The signal combiner 313 receives signals from the distributor 302, the antenna element 6 and antenna element 9. After receiving the signals, the signal combiner 312 combines the signal and transmits the combined signal to the receiver 3.

The signal combiner 314 receives signals from the signal distributor 302, the antenna element 8 and antenna element 10. After receiving the signals, the signal combiner 312 combines the signal and transmits the combined signal to the receiver 4.

In other words, the signal distributor passes the signal of the boundary antennas element located at the boundary between sub antenna arrays to both signal combiners corresponding to the sub antenna arrays, which commonly contain the boundary antenna elements.

As mentioned above, if the signal of the antenna element 4 is passed to both of the sub antenna array 1 and sub antenna array 2, or if the signal of the antenna element 7 is passed to both of the sub array antenna 3 and sub array antenna 4, then symmetrical structure of comparative phases of four sub arrays 101 to 104 can be obtained. As mentioned above, the present invention can obtain the symmetric structure of comparative phases of four sub arrays antennas. Some of the antenna elements are shared by at least two sub array antennas. By using the symmetrical structure of comparative phases, the present invention can find the optimal direction to receive a satellite signal effectively.

FIG. 4 is a graph for explaining the sub array phase of FIG. 3.

Referring to FIG. 4, there are four patterns according to the comparative phase values of the sub antenna arrays. In case of pattern E and G, received values of the sub antenna arrays are vertically symmetric. Also, in case of pattern F and H, received values of the sub antenna arrays are horizontally symmetric.

Therefore, by using the present invention, the active phase array antenna can find the optimal direction for receiving the satellite signal without using the same number of array antenna elements in each sub antenna array.

Moreover, by passing the signal received from antenna elements located at the boundary between two sub antenna arrays to the signal combiners of two sub antenna arrays which commonly include the antenna elements, the active phase array antenna of the present invention can decrease radical variations of phase differences. As a result, the receiving characteristic is improved and detailed information regarding tracing the signal can be supplied for obtaining more accurate data.

As mentioned above, the present invention distributes signal received from the antenna element located on boundary between sub array antennas to both of the signal combiners corresponding to sub array antennas. As a result, the present invention can find the optimal direction to receive the satellite signal and decrease sudden phase difference of each sub arrays.

The present invention describes in detail a preferred embodiment of ten antenna array element. However, it is obvious to a skilled person in the same art that the present invention can produce the same effect to an active phase array antenna having any other numbers of the antenna array elements.

As mentioned above, the present invention can prevent degrading the performance caused by sudden phase difference and can effectively receive tracing signal by passing a signal of antenna element located at boundary between sub arrays antenna to both signal combiners corresponding to both of antenna arrays.

Furthermore, the present invention can obtain a symmetrical structure of phases between sub antenna arrays in a case that each of sub array antennas does not have the same number of antenna elements.

While the present invention has been described with respect to certain preferred embodiments, it will be apparent to those skilled in the art that various changes and modifications may be made without departing from the scope of the invention as defined in the following claims.

What is claimed is:

1. A signal combining apparatus of an active array antenna, comprising:
   a plurality of antenna elements arranged to form at least two sub antenna arrays, wherein each of the sub antenna arrays has an associated boundary antenna element located at a boundary between two neighboring sub antenna arrays;
   distribution means for receiving a signal from the boundary antenna element and distributing the signal;
   combine means for combining the distributed signal with signals of the antenna elements in the corresponding sub antenna array to produce combined signals; and
   circuitry to compare phases of each of the sub antenna arrays based on the combined signals to locate an optimal direction of a satellite signal.

2. The apparatus as mentioned in claim 1, wherein the number of the distribution means is the same as the number of the boundary antenna elements.

* * * * *